US011873778B2

(12) United States Patent
Iga

(10) Patent No.: US 11,873,778 B2
(45) **Date of Patent: *Jan. 16, 2024**

(54) SPARK IGNITION TYPE ENGINE

(71) Applicant: KUBOTA Corporation, Osaka (JP)

(72) Inventor: Michisuke Iga, Sakai (JP)

(73) Assignee: KUBOTA CORPORATION, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/984,019

(22) Filed: Nov. 9, 2022

(65) Prior Publication Data

US 2023/0203996 A1 Jun. 29, 2023

(30) Foreign Application Priority Data

Dec. 24, 2021 (JP) ................................ 2021-210224

(51) Int. Cl.
*F02D 9/02* (2006.01)
*F02D 13/02* (2006.01)

(52) U.S. Cl.
CPC ........... *F02D 9/02* (2013.01); *F02D 13/0234* (2013.01); *F02D 2009/0213* (2013.01)

(58) Field of Classification Search
CPC ...... F02D 9/02; F02D 31/003; F02D 41/0002; F02D 41/086
See application file for complete search history.

(56) References Cited

U.S. PATENT DOCUMENTS

| | | | | | |
|---|---|---|---|---|---|
| 5,086,667 | A * | 2/1992 | Katayama | F02D 29/02 | 123/588 |
| 5,638,788 | A * | 6/1997 | Sanvido | F02D 41/28 | 701/115 |
| 5,915,362 | A * | 6/1999 | Fuwa | F02D 43/00 | 123/179.18 |
| 6,338,331 | B1 * | 1/2002 | Watanabe | F02D 41/1454 | 123/399 |
| 7,975,670 | B2 * | 7/2011 | Ito | F02P 5/14 | 123/339.11 |
| 2001/0032615 | A1 * | 10/2001 | Yonezawa | F02D 43/00 | 123/399 |
| 2002/0174853 | A1 * | 11/2002 | Suzuki | F02D 41/086 | 123/339.23 |

(Continued)

*Primary Examiner* — Phutthiwat Wongwian
*Assistant Examiner* — Anthony L Bacon
(74) *Attorney, Agent, or Firm* — Panitch Schwarze belisario & Nadel LLP

(57) ABSTRACT

A spark ignition type engine adjusts a base lower limit value of a valve opening degree of an ISC valve to avoid excessive engine rotation that may occur when an increase correction by atmospheric pressure is performed. When a detected engine temperature becomes lower, the base lower limit value of the ISC valve opening degree is increased to the fully open side, and the base lower limit value is corrected to increase to the fully open side with an increase correction value on the basis of a detected atmospheric pressure in an engine middle-high temperature range where the engine temperature exceeds a predetermined value, and the increase correction value is increased to the fully open side as the detected atmospheric pressure becomes lower, and the increase correction is prohibited in an engine low temperature range where the engine temperature is equal to or lower than the predetermined value.

4 Claims, 10 Drawing Sheets

(56) References Cited

U.S. PATENT DOCUMENTS

| | | | | |
|---|---|---|---|---|
| 2005/0211222 | A1* | 9/2005 | Demura | F02D 37/02 123/352 |
| 2007/0012286 | A1* | 1/2007 | Vint | F02D 31/005 123/339.14 |
| 2014/0325983 | A1* | 11/2014 | Tsunooka | F02D 41/0007 60/602 |

* cited by examiner

SPARK IGNITION TYPE ENGINE

CROSS-REFERENCE TO RELATED APPLICATIONS

This application claims priority under 35 U.S.C. § 119(b) to Japanese Application No. 2021-210224, filed Dec. 24, 2021, the disclosure of which is incorporated herein by reference.

BACKGROUND OF THE INVENTION

(1) Field of the Invention

The present invention relates to a spark ignition type engine.

(2) Description of Related Art

In the conventional engine, in a case where the base lower limit value of the valve opening degree is corrected to increase by the atmospheric pressure, when the base lower limit value is large, the lower limit value becomes too large by the increase correction, and excessive engine rotation may occur. In this case, engine noise or gear noise during gear shift may occur.

An object of the present invention is to provide a spark ignition type engine capable of adjusting a base lower limit value of a valve opening degree of an ISC valve capable of avoiding excessive engine rotation that may occur when an increase correction by atmospheric pressure is performed.

SUMMARY OF THE INVENTION

The main configuration of the present invention is as follows.

The spark ignition type engine is configured such that as a detected engine temperature becomes lower, a base lower limit value (4*b*) of an ISC valve opening degree is increased (4*ba*) to the fully open side, and the base lower limit value (4*b*) is corrected to increase (4*ca*) to the fully open side with an increase correction value (4*c*) on the basis of a detected atmospheric pressure in an engine middle-high temperature range where the engine temperature exceeds a predetermined value, and in the increase correction (4*ca*), the increase correction value (4*c*) is increased (4*cb*) to the fully open side as the detected atmospheric pressure becomes lower, and an increase correction (4*ca*) is prohibited (4cc) in an engine low temperature range where the engine temperature is equal to or lower than the predetermined value.

The present invention has the following effects.

<<Effect 1>> Adjustments can be made to avoid excessive engine rotation.

In the engine low temperature range where the base lower limit value (4*b*) is relatively large, the increase correction (4*ca*) of the base lower limit value (4*b*) is prohibited (4cc), and adjustment for avoiding excessive engine rotation can be performed. Therefore, engine noise and gear noise at the time of gear shift can be prevented.

The reason why the base lower limit value (4*b*) is increased in the engine low temperature range is to avoid an engine stall due to insufficient output because the internal load of the engine is increased by increasing the viscosity of the engine oil.

<<Effect 2>> An engine stall during high altitude driving is avoided.

In the engine middle-high temperature range where the base lower limit value (4*b*) is relatively small, the base lower limit value (4*b*) is corrected to increase (4*ca*) on the basis of the atmospheric pressure during the high altitude operation to compensate for the decrease in the intake-air density, and the engine stall due to the incomplete combustion is avoided.

The reason why the base lower limit value (4*b*) can be reduced in the engine middle-high temperature range is that the internal load of the engine is small, and an engine stall due to insufficient output hardly occurs.

BRIEF DESCRIPTION OF THE DRAWINGS

FIGS. 3A and 3B are diagrams for explaining a control map of a lower limit value of an ISC valve opening degree, in which FIG. 3A shows a control map of a base lower limit value, and FIG. 3B shows a control map of an increase correction value;

FIGS. 4A and 4B are diagrams for explaining a control characteristic of a lower limit value of an ISC valve opening degree, in which FIG. 4A is a graph of a control characteristic based on an engine temperature, and FIG. 4B is a graph of a control characteristic based on an intake-air temperature;

DETAILED DESCRIPTION OF PREFERRED EMBODIMENTS

FIGS. 1 to 10 are diagrams for describing a spark ignition type engine according to an embodiment of the present invention, and in the embodiment, an inclined inline two-cylinder gasoline engine will be described.

Figure 9:
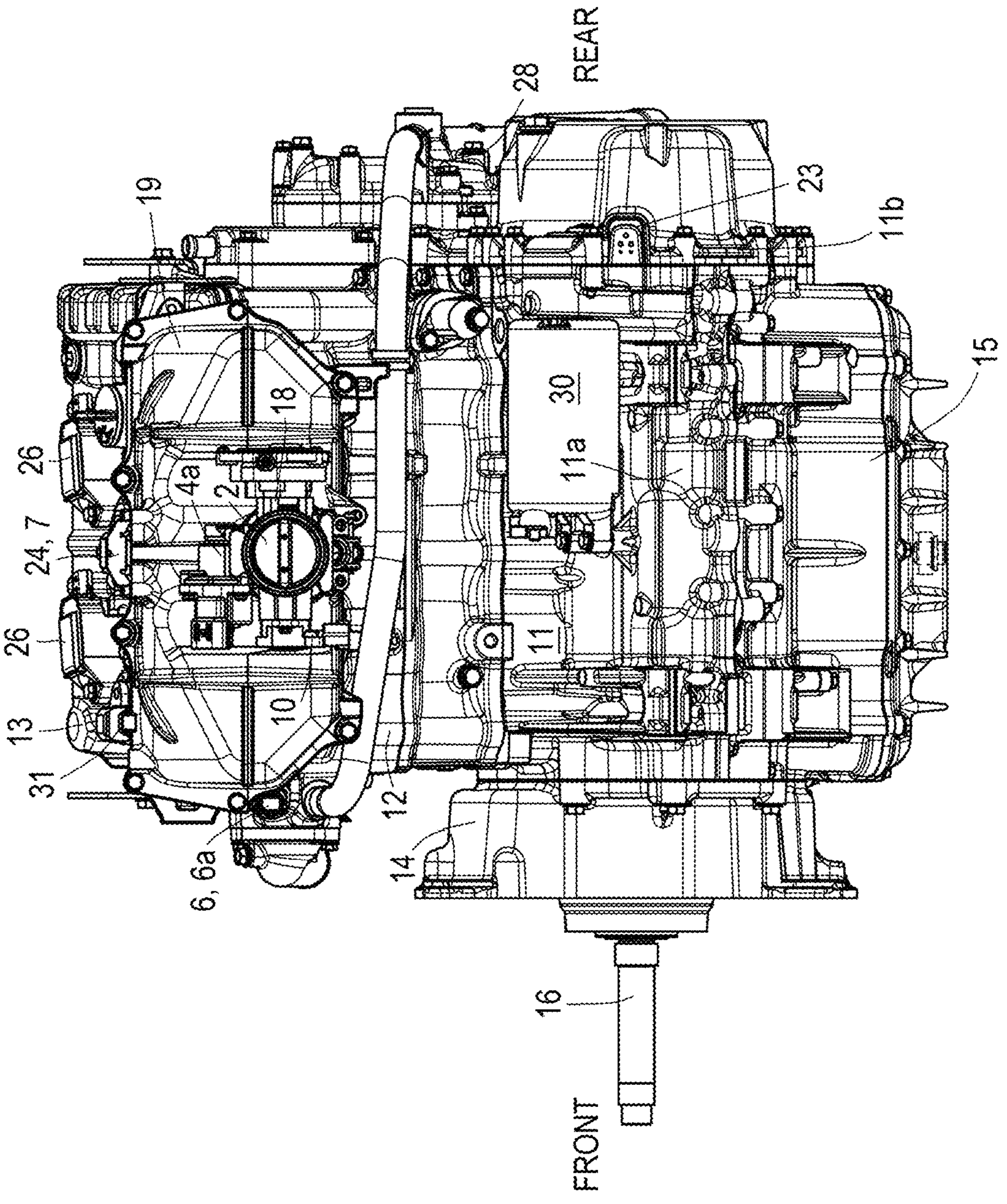
FIG. 9 is a side view of an air-intake side of the engine of FIG. 8.

As shown in FIG. 9, the engine includes a cylinder block (11), a cylinder head (12) assembled to an upper portion of the cylinder block (11), a cylinder head cover (13) assembled to an upper portion of the cylinder head (12), a flywheel housing (14) provided at one end of the cylinder block (11), a timing transmission device housing portion (11*b*) provided at the other end of the cylinder block (11), and an oil pan (15) assembled to a lower portion of the cylinder block (11).

Figure 8:
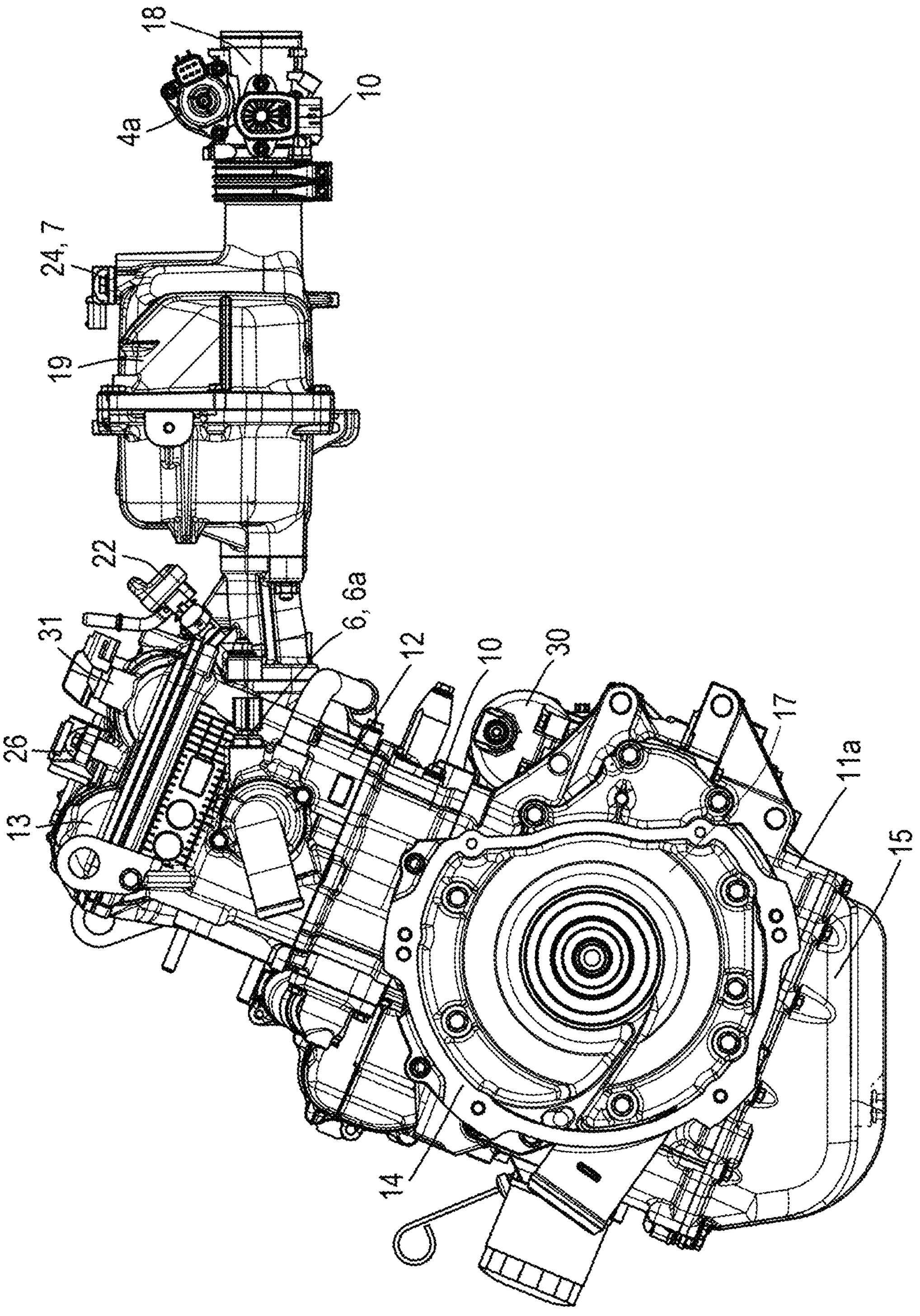
FIG. 8 is a front view of a spark ignition type engine according to an embodiment of the present invention.

A cylinder is housed in an upper portion of the cylinder block (11), and a crankshaft (16) is housed in a lower crankcase (11*a*). As shown in FIG. 8, a flywheel (17) is accommodated in the flywheel housing (14). The timing transmission device is housed in the timing transmission device housing portion (11*b*).

Figure 10:
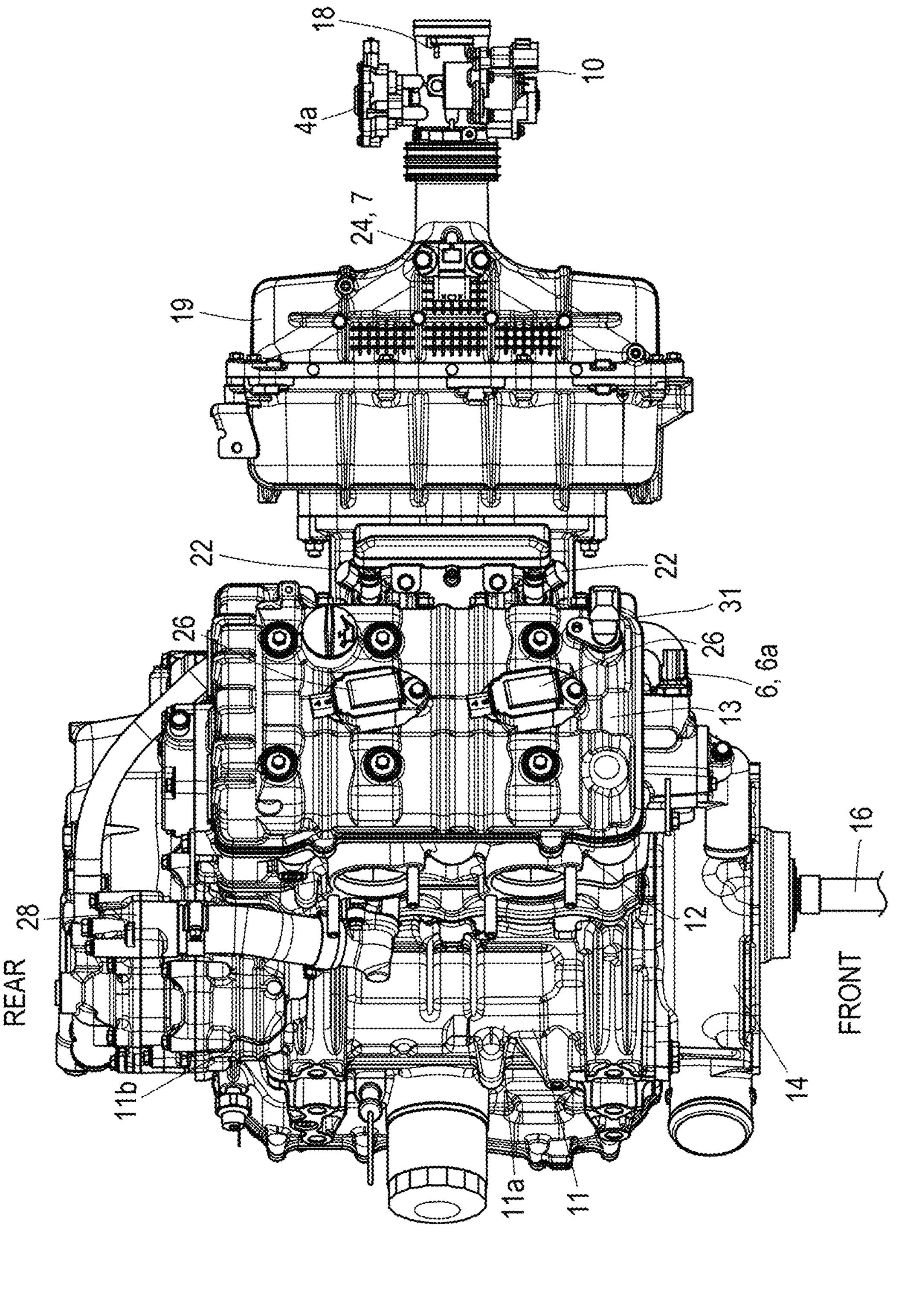
FIG. 10 is a plan view of the engine of FIG. 8.

As shown in FIGS. 9 and 10, assuming that the installation direction of the crankshaft (16) is the front-rear direction, one of which is the front and the other of which is the rear, the flywheel housing (14) is disposed at the front of the cylinder block (11), and the timing transmission device housing portion (11*b*) is disposed at the rear of the cylinder block (11).

The engine includes an air-intake device, a fuel supply device, an ignition device, an exhaust device, a starting device, and an engine coolant device.

The air-intake device is a device that supplies intake-air to a cylinder, and includes an air cleaner (not illustrated), an intake-air duct (not illustrated), a throttle body (18) illustrated in FIGS. 8 and 10, an air-intake manifold (19), and an air-intake port in the cylinder head (12) in order from an intake-air upstream side. This engine is of a natural air-intake type and does not include a supercharger.

The air-intake manifold (19) is assembled to the cylinder head (12) and also serves as a surge tank.

Figure 1:
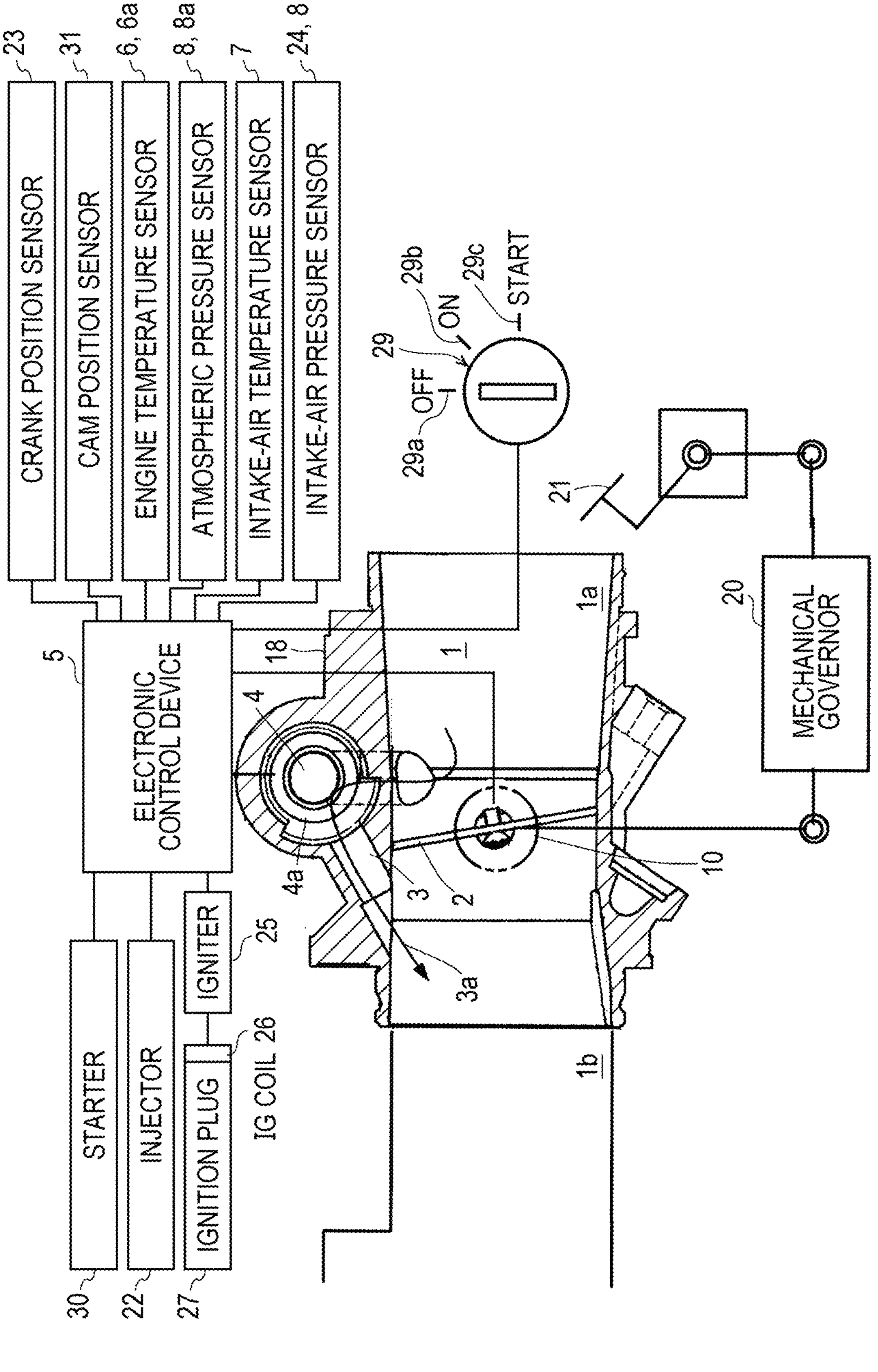
FIG. 1 is a block diagram illustrating a main part of a spark ignition type engine according to an embodiment of the present invention.

As illustrated in FIG. 1, the throttle body (18) is a component that adjusts an intake-air amount, and is assembled to an air-intake manifold (19).

The throttle body (18) includes a main intake-air passage (1), a throttle valve (2) of the main intake-air passage (1), a bypass intake-air passage (3) bypassing the throttle valve (2), and an ISC valve (4) of the bypass intake-air passage (3).

The ISC valve is an abbreviation of an idling speed control valve, and hereinafter, an abbreviation of an ISC valve is used in the same manner.

In this engine, the opening degree of the ISC valve (4) is adjusted by the control of the electronic control device (5) illustrated in FIG. 1 to control the idling speed and the like.

The throttle valve (2) is interlocked with an accelerator pedal (21) via a mechanical governor (20).

The electronic control device (5) electronically controls each component of the engine, and uses an engine ECU. The ECU is an abbreviation of an electronic control unit.

As shown in FIG. 1, the ISC valve (4) is a valve that adjusts the flow rate of the bypass intake-air (3*a*) passing through the bypass intake-air passage (3), and is driven by an ISC valve actuator (4*a*) using a needle valve. A stepping motor is used as the ISC valve actuator (4*a*).

A fuel supply device is a device that injects fuel into intake-air to form an air-fuel mixture, and includes an injector (22) as illustrated in FIG. 1. An electromagnetic valve of the injector (22) is opened and closed at a predetermined timing by control of an electronic control device (5), and a predetermined amount of fuel is injected at a predetermined fuel injection timing.

The fuel injection timing and the fuel injection amount are determined by calculation of the electronic control device (5) on the basis of the fuel injection map from the engine speed, the engine temperature, the atmospheric pressure, the intake-air pressure, and the intake-air temperature, and an air-fuel mixture having an appropriate air-fuel ratio is formed.

The fuel injection map is stored in a storage unit of the electronic control device (5).

The opening/closing timing of the electromagnetic valve of the injector (22) is specified by a crank angle.

The injector (22) shown in FIGS. 8 and 10 is inserted into an air-intake port of each cylinder in the cylinder head (12). Since this engine is a two-cylinder engine, two injectors (22) are disposed as illustrated in FIG. 10.

The crank angle is detected by a crank position sensor (23) illustrated in FIG. 1 and the like.

The engine speed is calculated by the electronic control device (5) on the basis of a change rate of a crank angle detected by the crank position sensor (23).

An engine temperature is detected by an engine temperature sensor (6) illustrated in FIG. 1 or the like, an atmospheric pressure is detected by an atmospheric pressure detector (8), an intake-air pressure is detected by an intake-air pressure sensor (24), and an intake-air temperature is detected by an intake-air temperature sensor (7).

Although the engine coolant temperature sensor (6*a*) is used as the engine temperature sensor (6) that detects the engine temperature, an engine oil temperature sensor or a cylinder wall temperature sensor may be used instead of the engine coolant temperature sensor (6*a*).

Although the atmospheric pressure sensor (8*a*) disposed outside the intake-air path is used in the atmospheric pressure detector (8), an intake-air pressure sensor (24) disposed in the intake-air path may be used instead. That is, if the intake-air pressure in the intake-air path is detected by the intake-air pressure sensor (24) when a key switch (29) illustrated in FIG. 1 is turned on from the OFF position (29*a*) to the ON position (29*b*) before the engine is started, the intake-air pressure matches the atmospheric pressure. Therefore, the control based on the atmospheric pressure can be performed by regarding the intake-air pressure before the engine is started as the atmospheric pressure even when the engine is started or the engine is operated thereafter.

This engine is a 4-cycle engine. An air-intake stroke and an expansion stroke of each cylinder cannot be identified, and a compression stroke and an exhaust stroke cannot be identified only by detecting a crank angle. Therefore, a cam angle of a valve cam is detected by a cam position sensor (31) illustrated in FIG. 1 and the like, and an electronic control device (5) identifies a stroke of a combustion cycle of each cylinder.

Figure 7:
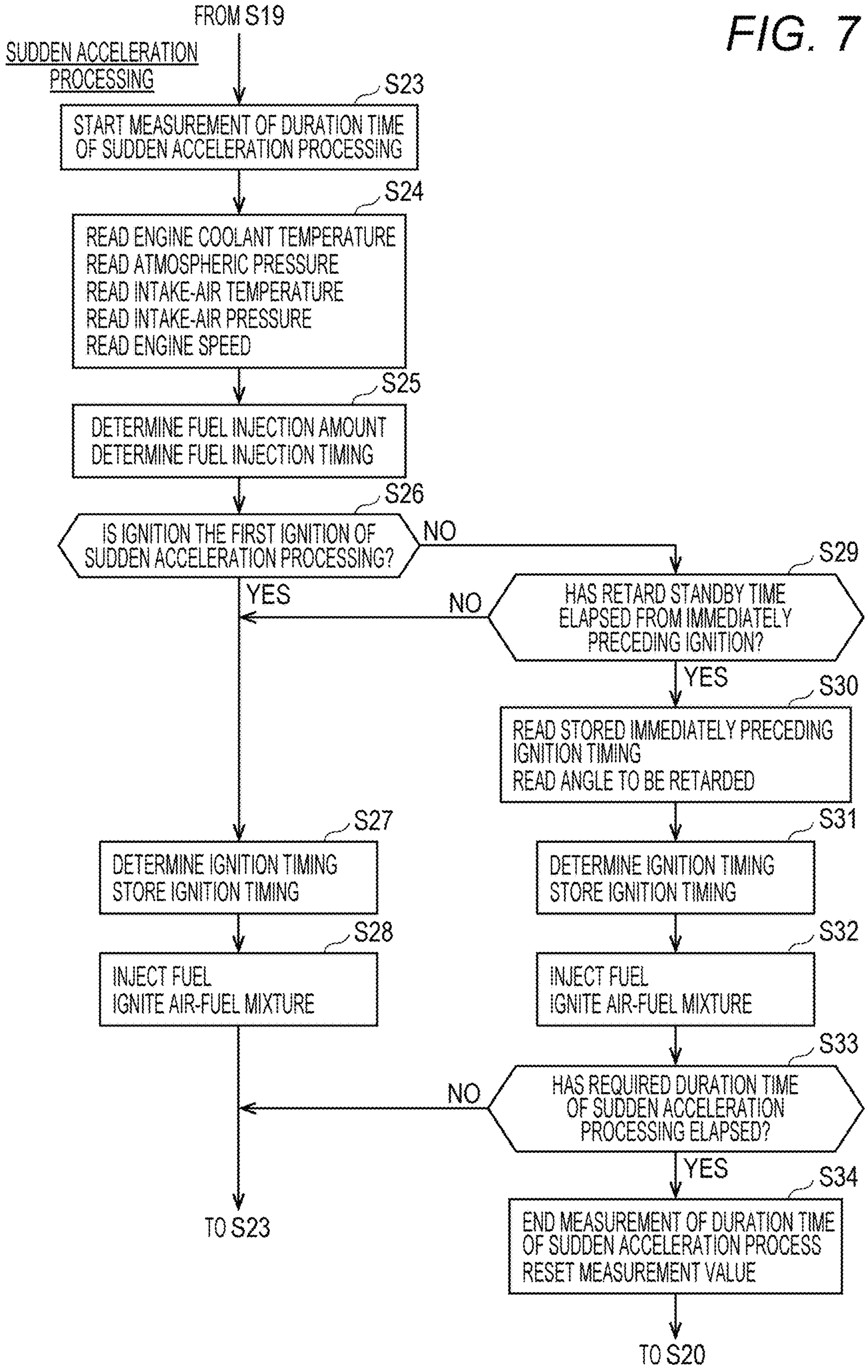
FIG. 7 is a flowchart portion of a sudden acceleration processing subsequent to FIG. 6.

As shown in FIGS. 8 and 9, the engine coolant temperature sensor (6*a*) is disposed at the coolant outlet of the head jacket in the cylinder head (12). As shown in FIGS. 8 to 10, the intake-air pressure sensor (24) is disposed in the air-intake manifold (19) integrally with the intake-air temperature sensor (7). As shown in FIG. 7, the crank position sensor (23) is disposed in the timing transmission device housing portion (11*b*). As shown in FIGS. 8 to 10, the cam position sensor (31) is disposed in the cylinder head (12).

The ignition device is a device that ignites an air-fuel mixture, and as shown in FIG. 1, the ignition device includes an igniter (25), an ignition coil (26), and an ignition plug (27), and a spark is blown from the ignition plug (27) at a predetermined ignition timing by control of an electronic control device (5).

The ignition timing is determined by calculation of the electronic control device (5) on the basis of the ignition timing map from the engine speed, the engine coolant temperature, the atmospheric pressure, the intake-air pressure, and the intake-air temperature.

The ignition plug (27) is attached to a cylinder head in a cylinder head cover and is fitted to a plug cap (not shown), and the ignition coil (26) shown in FIGS. 8 to 10 is attached to an upper end portion of the plug cap and is disposed above the cylinder head cover (13).

Since this engine is a two-cylinder engine, two ignition plugs (27) are disposed, and two ignition coils (26) are also disposed as illustrated in FIG. 10.

The exhaust device is a device that discharges exhaust of a cylinder, and includes an exhaust port in the cylinder head (12), an exhaust manifold, an exhaust pipe, a three-way catalyst, and an exhaust muffler from an exhaust upstream. These components are not shown in the drawings.

The engine coolant device is a device that cools an engine with engine coolant, and is configured such that engine coolant in the cylinder jacket in the cylinder block (11) circulates back to the cylinder jacket via the head jacket in the cylinder head (12), a radiator (not shown), and a water pump (28) in order.

As shown in FIGS. 9 and 10, the water pump (28) is disposed behind cylinder block (11).

The starting device is a device for starting an engine, and includes the key switch (29) and a starter (30) as illustrated in FIG. 1.

When the key switch (29) is turned on from the OFF position (29*a*) to the start position (29*c*), the starter (30) is energized from a battery (not illustrated), and the crankshaft (16) is driven by cranking. When the engine speed reaches a predetermined cranking end determination value, the pinion gear (not shown) of the starter (30) is disengaged from the ring gear (shown) of the crankshaft (16), the energization from the battery to the starter (30) is also released, and the cranking ends. The cranking end determination value is set to a complete explosion rotation speed (about 1300 rotations per minute).

Figure 2A:
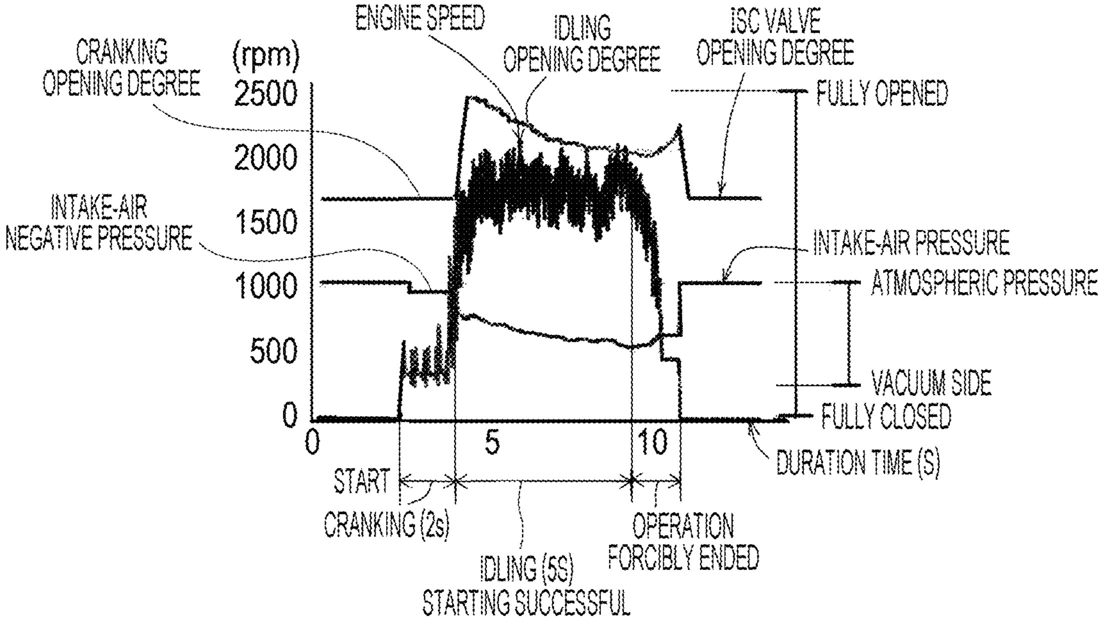
FIG. 2A is a time chart of an engine start test according to an embodiment of the present invention.

As shown in FIG. 2A, the engine is configured such that when the engine is started, cranking is performed at a cranking opening degree at which the ISC valve (4) is narrowed by a predetermined amount from a full opening under the control of the electronic control device (5), so that an intake-air negative pressure is generated on an intake-air downstream side (1*b*) of the ISC valve (4) shown in FIG. 1.

Therefore, the intake-air negative pressure promotes fuel vaporization and enables fuel and air mixing to be favorable, and improved combustion results in better engine startability.

Figure 2B:
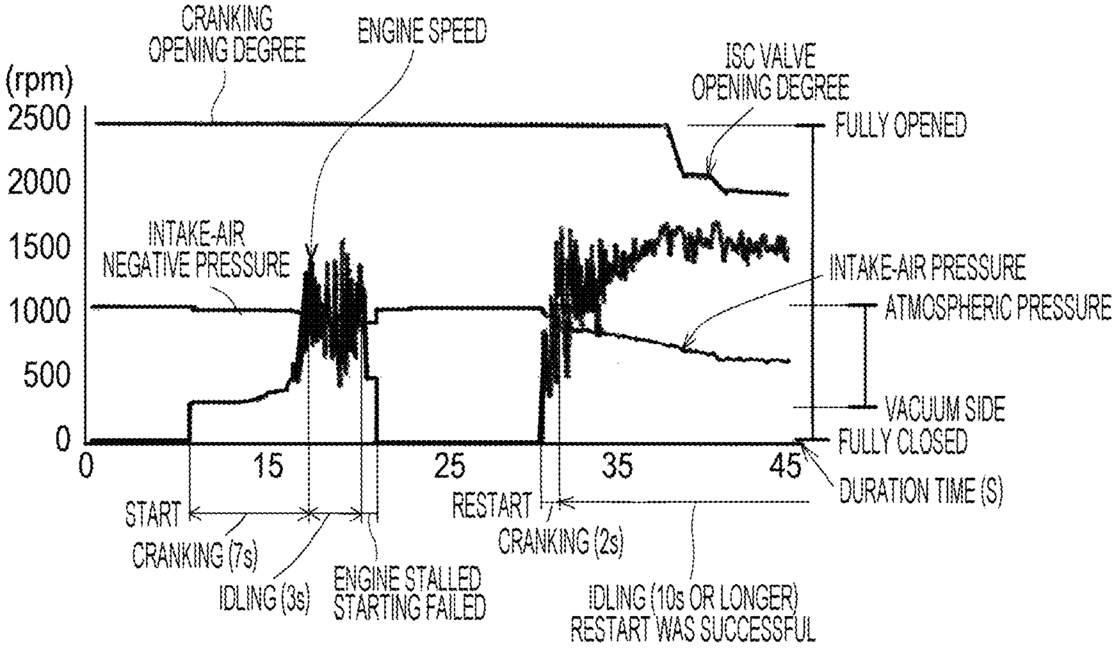
FIG. 2B is a time chart of a comparative example.

FIGS. 2A and 2B are time charts of an engine start test, FIG. 2A illustrates an embodiment of the present invention, and FIG. 2B illustrates a comparative example.

In the engine starting test of the embodiment of the present invention shown in FIG. 2A, cranking was performed by setting the ISC valve (4) to a cranking opening degree narrowed by a predetermined amount from a full opening. Therefore, a large intake-air negative pressure was generated during cranking, the engine speed reached a cranking end determination value (about 1300 revolutions per minute) in a short time (about 2 seconds), and after the cranking was ended, a stable idling operation was maintained for a predetermined time (about 5 seconds). Therefore, it was determined that the engine starting was successful, the engine operation was forcibly ended, and the engine starting test was ended.

On the other hand, as shown in FIG. 2B, in the engine starting test of the comparative example, cranking was performed with the ISC valve (4) set to the cranking opening degree of full opening, and thus the intake-air negative pressure during cranking was small, the cranking continued for a long period of time (about 7 seconds), and the idling operation for a short time (about 3 seconds) was maintained after the cranking ended, but the engine stalled immediately after that, and the engine starting failed.

Thereafter, in the restart processing similarly performed, since the stable idling operation was maintained for a long period (10 seconds or more) after cranking for a short period (about 2 seconds), it was determined that restart was successful. It is considered that the restart was successful because the engine temperature was increased in the first engine start processing.

As described above, in the comparative example, the initial engine start has failed, whereas in the embodiment, there is no failure even in the initial engine start, and it can be seen that the startability of the engine of the embodiment is favorable.

As shown in FIG. 1, the engine includes the engine temperature sensor (6), and is configured such that the cranking opening degree of the ISC valve (4) is more narrowed as the detected engine temperature is lower.

Therefore, as the engine temperature becomes lower, the intake-air negative pressure becomes larger, and the cold startability of the engine becomes more favorable.

As shown in FIG. 1, the engine includes the intake-air temperature sensor (7), and is configured such that the cranking opening degree of the ISC valve (4) is more narrowed as the detected intake-air temperature is lower.

Therefore, as the intake-air temperature becomes lower, the intake-air negative pressure becomes larger, and the cold startability of the engine becomes more favorable.

The cranking opening degree is determined by calculation of the electronic control device (5) on the basis of the cranking opening degree map from the engine coolant temperature and the intake-air temperature.

The cranking opening degree map is stored in the storage unit of the electronic control device (5).

The engine is configured such that the intake-air amount at the time of cranking is 30% to 70% of the intake-air amount when the ISC valve (4) is fully opened by setting the cranking opening degree of the ISC valve (4).

When the intake-air amount at the time of cranking is less than 30% of the amount of intake-air when the ISC valve (4) is fully open, intake-air is insufficient. When the amount of intake-air exceeds 70%, the intake-air negative pressure is insufficient, and failure of engine start easily occurs in any case. However, failure is less likely to occur within the above range.

As shown in FIG. 2A, the engine is configured such that the idling opening degree of the ISC valve (4) immediately after the cranking is finished is larger than the cranking opening degree.

Therefore, the intake-air amount increases in the idling operation immediately after the cranking ends, and the idling operation is stabilized.

As shown in FIG. 1, the engine includes the engine temperature sensor (6) and the atmospheric pressure sensor (8*a*).

Figure 3A:
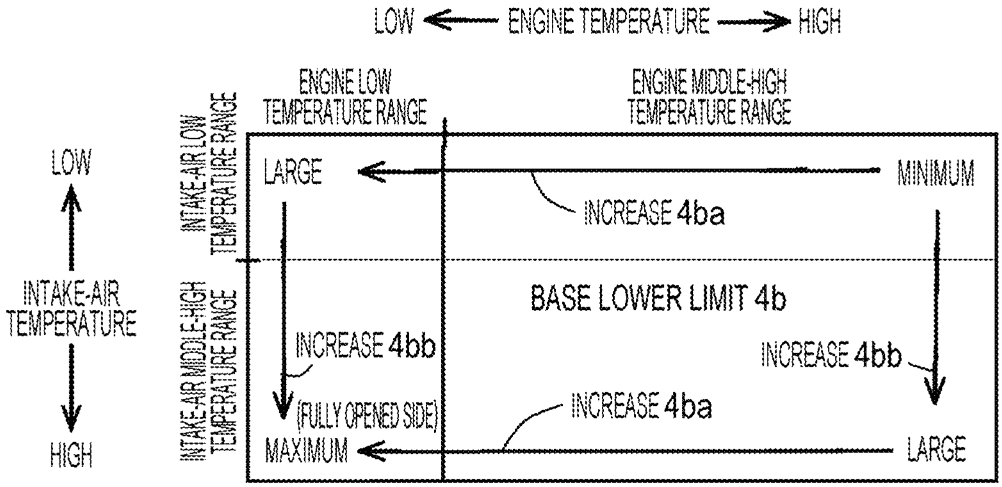
Figure 4A:
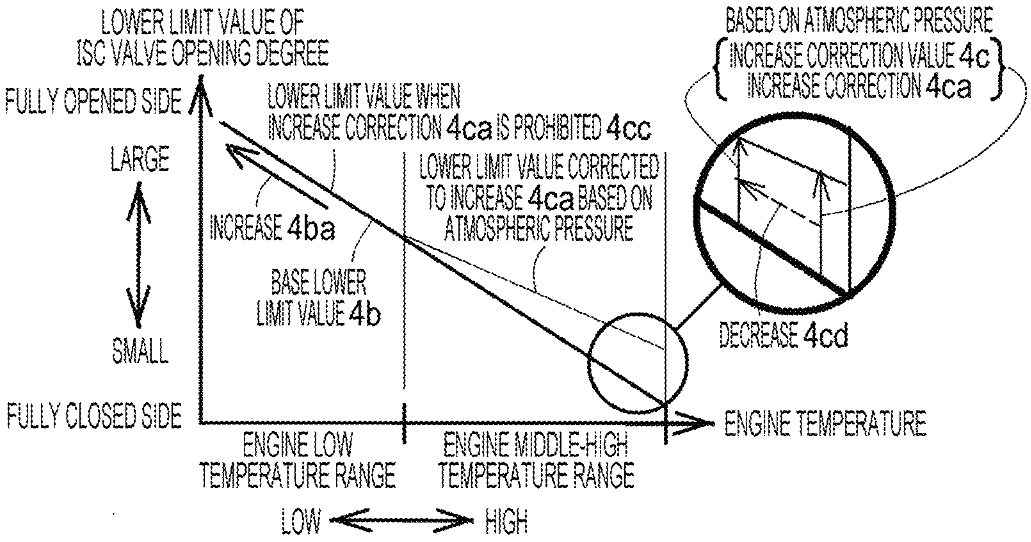
Figure 4B:
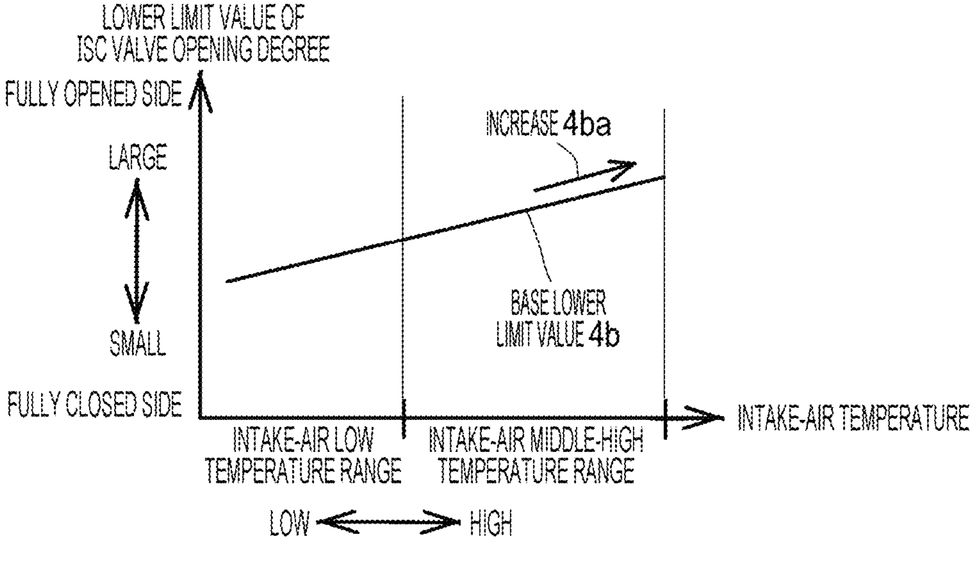

As illustrated in FIGS. 3A and 4A, as the detected engine temperature becomes lower, the base lower limit value (4*b*) of the ISC valve opening degree is increased to the fully open side (4*ba*).

Figure 3B:
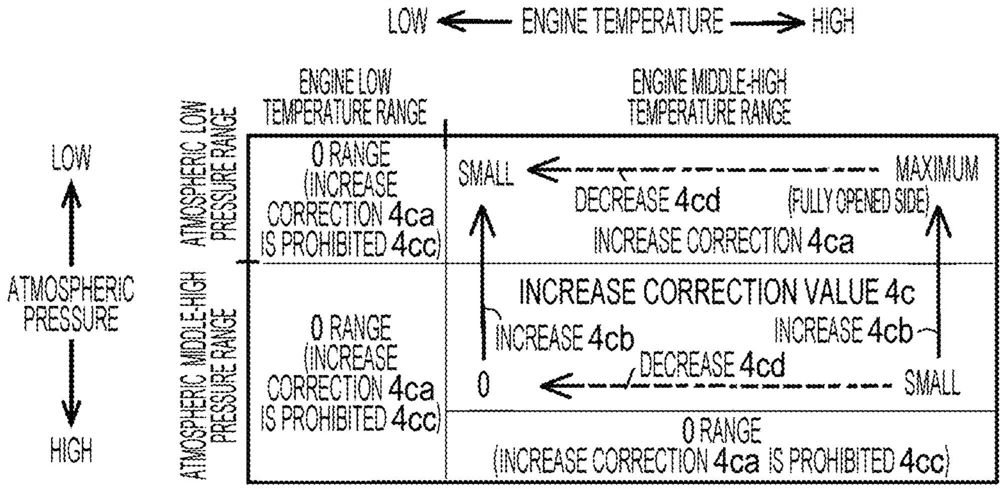

As shown in FIG. 4A, in the engine middle-high temperature range where the engine temperature exceeds the predetermined value, the base lower limit value (4*b*) is corrected to increase (4*ca*) to the fully open side with the increase correction value (4*c*) on the basis of the detected atmospheric pressure. As shown in FIG. 3B, in the increase correction (4*ca*), as the detected atmospheric pressure becomes lower, the increase correction value (4*c*) is increased (4*cb*) to the fully open side.

As illustrated in FIGS. 3B and 4A, the engine is configured such that the increase correction (4*ca*) is prohibited (4cc) in an engine low temperature range where the engine temperature is equal to or lower than a predetermined value.

As shown in FIGS. 3A and 4A, in this engine, in the engine low temperature range where the base lower limit value (4*b*) is relatively large, the increase correction (4*ca*) of the base lower limit value (4*b*) is prohibited (4cc) as shown in FIGS. 3B and 4A, and adjustment for avoiding excessively high engine rotation can be performed. Therefore, engine noise and gear noise at the time of gear shift can be prevented.

The reason why the base lower limit value (4*b*) is increased in the engine low temperature range is to avoid an engine stall due to insufficient output because the internal load of the engine is increased by increasing the viscosity of the engine oil.

As shown in FIGS. 3B and 4A, in the engine middle-high temperature range where the base lower limit value (4*b*) is relatively small, the base lower limit value (4*b*) is corrected to increase (4*ca*) on the basis of the atmospheric pressure during the high altitude operation to compensate for the decrease in the intake-air density, and the engine stall due to the incomplete combustion is avoided.

The reason why the base lower limit value (4*b*) can be reduced in the engine middle-high temperature range is that the internal load of the engine is small, and an engine stall due to insufficient output hardly occurs.

As illustrated in FIGS. 3B and 4A, the engine is configured such that the increase correction value (4*c*) decreases (4*cd*) as the detected engine temperature decreases in the engine middle-high temperature range.

Therefore, as illustrated in FIG. 4A, in the engine middle-high temperature range where the base lower limit value (4*b*) gradually increases due to the decrease in the engine temperature, the increase correction value (4*c*) conversely gradually decreases, and it is possible to perform adjustment to avoid excessively high engine rotation.

As shown in FIG. 1, the engine includes the intake-air temperature sensor (7).

As illustrated in FIGS. 3A and 4A, the engine is configured such that the base lower limit value (4*b*) of the ISC valve opening degree is increased (4*bb*) to the fully open side as the detected intake-air temperature becomes higher.

Therefore, in the intake-air middle-high temperature range where the intake-air density is relatively low, the base lower limit value (4*b*) increases (4*bb*), a decrease in the intake-air density is compensated for, and an engine stall due to incomplete combustion is avoided.

Figure 6:
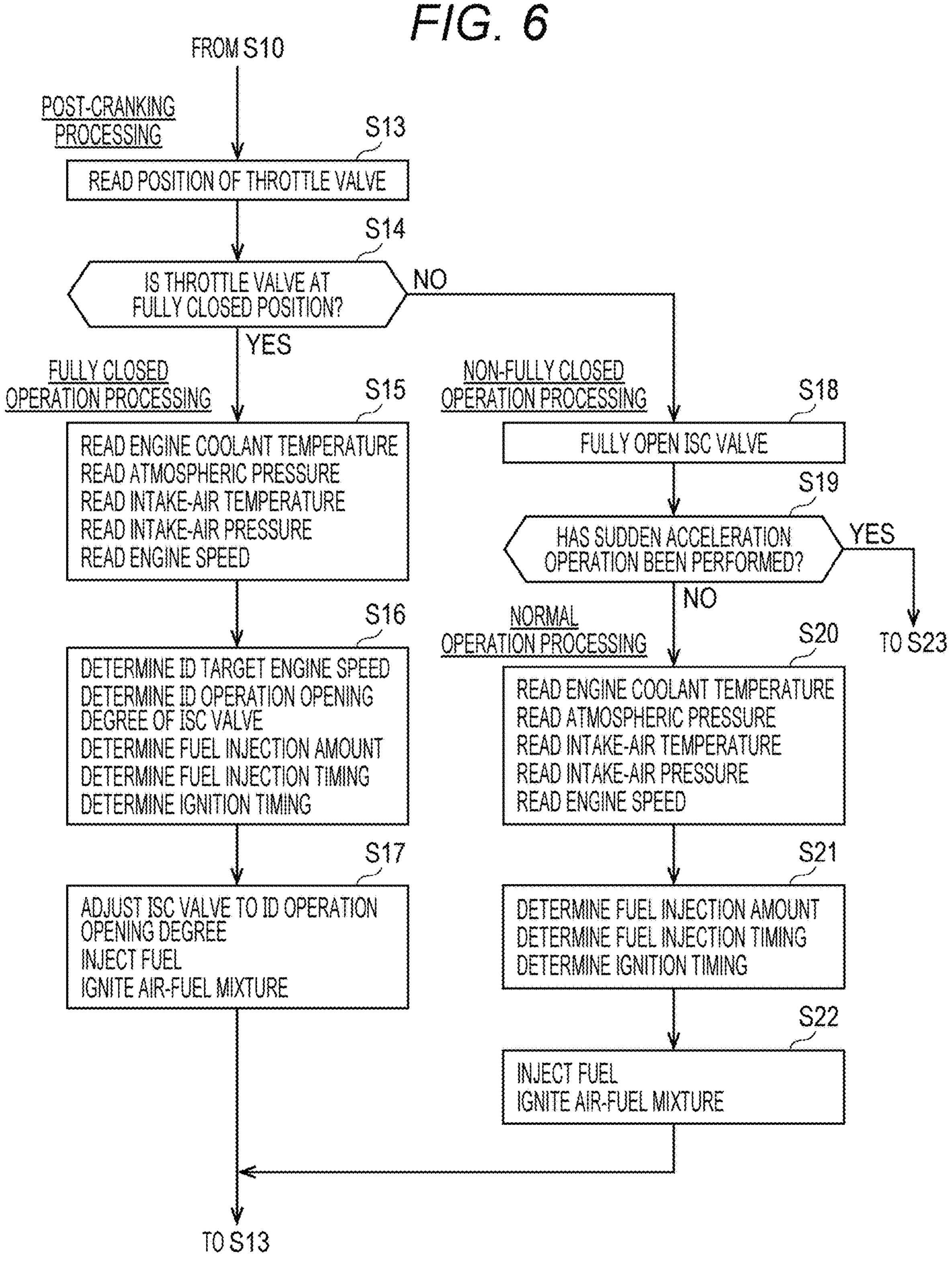
FIG. 6 is a flowchart portion of post-cranking processing subsequent to FIG. 5.

As shown in FIG. 1, the engine includes a sudden acceleration operation detection sensor (10). Under the control of the electronic control device (5), as shown in FIG. 6, when a sudden acceleration operation is not detected, a normal driving processing is performed. When a sudden acceleration operation is detected, as shown in FIG. 7, the sudden acceleration processing is performed over a required duration, and then the processing shifts to the normal driving processing.

In the sudden acceleration processing, the advance angle of the ignition timing is set to be larger than that in the normal driving processing, and as illustrated in FIG. 7, the advance angle is temporally retarded during a required duration of the sudden acceleration processing.

For this reason, when the processing shifts from the sudden acceleration processing at the large advance angle with favorable acceleration responsiveness to the normal driving processing at the small advance angle with favorable knocking prevention, a rapid decrease in the output due to a rapid decrease in the advance angle is avoided, and the torque shock is reduced.

The advance angle, the duration time, the retarded angular velocity, and the angle to retard the ignition timing in the sudden acceleration processing are determined by calculation of the electronic control device (5) on the basis of a sudden acceleration ignition timing map.

The sudden acceleration ignition timing map is stored in the storage unit of the electronic control device (5).

A throttle position sensor is used as the sudden acceleration operation detection sensor (10) illustrated in FIG. 1, and when detecting that a valve opening speed of the throttle valve (2) exceeds a predetermined value, an electronic control device (5) determines that a sudden acceleration operation has been performed.

A flow of control by the electronic control device (5) will be described.

Figure 5:
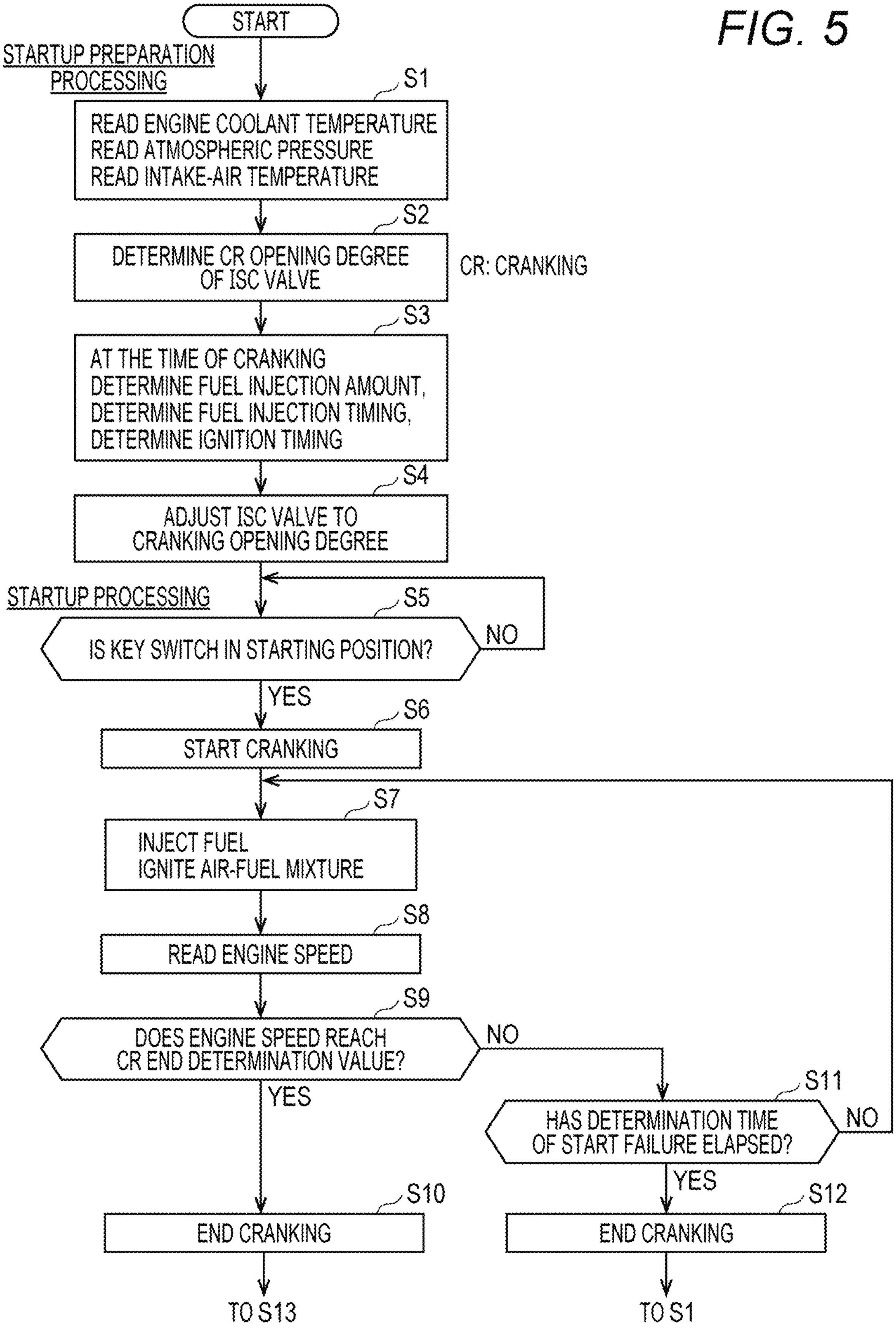
FIG. 5 is a flowchart portion related to engine start in a flowchart of control by an electronic control device.

As shown in FIG. 5, in the startup preparation processing, the engine coolant temperature, the atmospheric pressure, and the intake-air temperature are read in step (S1), the cranking opening degree of the ISC valve (4) is determined in step (S2), the fuel injection amount, the fuel injection timing, and the ignition timing at the time of cranking are determined in step (S3), the ISC valve (4) is adjusted to the cranking opening degree in step (S4), and the processing proceeds to step (S5), which is a start step of the startup processing.

As shown in FIG. 5, in the starting processing, it is determined in step (S5) whether the key switch (29) is in the start position (29*c*) (the determination is repeated until affirmative determination is made). When affirmative determination is made, cranking is started in step (S6), fuel is injected and the air-fuel mixture is ignited in step (S7). The engine speed is read in step (S8). When affirmative determination is made, it is determined in step (S9) whether the engine speed reaches a predetermined cranking end determination value. When affirmative determination is made, cranking is ended in step (S10), and the processing proceeds to step (S13) which is a step of starting the post-cranking processing shown in FIG. 4.

When the determination in step (S9) is negative, it is determined in step (S11) whether the determination time of the start failure has elapsed. When the determination is affirmative, cranking is ended in step (S12), and the processing returns to step (S1) which is a start step of the start preparation processing for restart. When the determination in step (S11) is negative, the processing returns to step (S7).

FIG. 6 is a flowchart of post-cranking processing.

As shown in FIG. 6, the position of the throttle valve (2) is read in step (S13), which is a start step of the post-cranking processing, it is determined whether or not the throttle valve (2) is at the fully closed position in step (S14), and if affirmative determination is made, the processing proceeds to step (S15), which is a start step of the fully closed operation processing, and if negative determination is made, the processing proceeds to step (S18), which is a start step of the non-fully closed operation processing.

As shown in FIG. 6, in the fully closed operation processing (processing such as idling operation), the engine coolant temperature, the atmospheric pressure, the intake-air temperature, the intake-air pressure, and the engine speed are read in step (S15), the idling target speed, the idling operation opening degree of the ISC valve (4), the fuel injection amount, the fuel injection timing, and the ignition timing are determined in step (S16), the ISC valve (4) is adjusted to the idling operation opening degree, fuel is injected, and the air-fuel mixture is ignited in step (S17), and the processing returns to step (S13), which is a start step of the post-cranking processing.

In the fully closed operation processing, the engine speed feedback control for bringing the engine speed close to the idling target speed is performed under the control of the electronic control device (5).

As shown in FIG. 6, in the non-fully closed operation processing (processing such as the loaded operation), the ISC valve is fully opened in step (S18), and it is determined whether or not the sudden acceleration operation has been performed in step (S19). If negative determination is made, the processing proceeds to step (S20), which is a start step of the normal driving processing. If positive determination is made, the processing proceeds to step (S23), which is a start step of the sudden acceleration processing shown in FIG. 7.

As shown in FIG. 6, in the normal driving processing, the engine coolant temperature, the atmospheric pressure, the intake-air temperature, the intake-air pressure, and the engine speed are read in step (S20), the fuel injection amount, the fuel injection timing, and the ignition timing are determined in step (S21), the fuel is injected and the air-fuel mixture is ignited in step (S22), and the processing returns to step (S13), which is a start step of the post-cranking processing.

As shown in FIG. 7, in the sudden acceleration processing, the measurement of the duration time of the sudden acceleration processing is started in step (S23), the engine coolant temperature, the atmospheric pressure, the intake-air temperature, the intake-air pressure, and the engine speed are read in step (S24), the fuel injection amount and the fuel injection timing are determined in step (S25), it is determined whether the ignition is the first ignition of the sudden acceleration processing in step (S26), when affirmative determination is made, the ignition timing is determined and the ignition timing is stored in step (S27), the fuel is injected and the air-fuel mixture is ignited in step (S28), and the processing returns to step (S23).

In a case where the determination in step (S26) is negative, that is, in a case where the ignition is the second or subsequent ignition in the sudden acceleration processing, it is determined in step (S29) whether or not a predetermined retard standby time has elapsed from the immediately preceding ignition, and if affirmative, the immediately preceding ignition timing stored in step (S30) is read and the angle to be retarded from the immediately preceding ignition timing is read, and the ignition timing is determined and the ignition timing is stored in step (S31). The advance angle of the ignition timing to be determined is a value obtained by subtracting the angle to be retarded from the advance angle of the immediately preceding ignition timing, and approaches the advance angle of the ignition timing of the normal driving processing to be shifted. A limit is imposed on the determination in step (S31), and retarding the ignition timing to an advance angle smaller than the ignition timing of the normal driving processing to be shifted is prohibited. Following step (S31), fuel is injected and the air-fuel mixture is ignited in step (S32). In step (S33), it is determined whether the required duration time of the sudden acceleration processing has elapsed. If negative, the processing returns to step (S23).

When the determination in step (S29) is negative, that is, when the retard waiting time has not elapsed from the immediately preceding ignition, the processing proceeds to step (S27), and the ignition timing to be determined is the same advance angle as the immediately preceding ignition timing.

When the determination in step (S33) is affirmative, the measurement of the duration time of the sudden acceleration processing is ended in step (S34), the measurement value is reset, and the processing returns to step (S20) which is the start step of the normal driving processing.

What is claimed is:

1. A spark ignition type engine comprising:

a main intake-air passage; a throttle valve of the main intake-air passage; a bypass intake-air passage bypassing the throttle valve; an ISC valve of the bypass intake-air passage; and an electronic control device that controls an engine speed by adjusting an ISC valve opening degree;

an engine temperature sensor; and atmospheric pressure sensor, wherein as a detected engine temperature becomes lower, a base lower limit value of the ISC valve opening degree is increased to a fully open side, and the base lower limit value is corrected to increase to the fully open side with an increase correction value based on a detected atmospheric pressure in an engine middle-high temperature range where the engine temperature exceeds a predetermined value, and in the increase correction, the increase correction value is increased to the fully open side as the detected atmospheric pressure becomes lower, and the increase correction is prohibited in an engine low temperature range where the engine temperature is equal to or lower than the predetermined value.

2. The spark ignition type engine according to claim 1, wherein the increase correction value decreases as the detected engine temperature decreases in the engine middle-high temperature range.

3. The spark ignition type engine according to claim 1, comprising an intake-air temperature sensor, wherein the base lower limit value of the ISC valve opening degree is increased to the fully open side as a detected intake-air temperature becomes higher.

4. The spark ignition type engine according to claim 2, comprising an intake-air temperature sensor, wherein the base lower limit value of the ISC valve opening degree is increased to the fully open side as a detected intake-air temperature becomes higher.

* * * * *